United States Patent
Ishida et al.

[11] Patent Number: 5,906,185
[45] Date of Patent: May 25, 1999

[54] THROTTLE VALVE CONTROLLER

[75] Inventors: Katsumi Ishida, Toyoake; Hiroshi Takamatsu, Chiryu; Hiroyuki Makisako, Obu; Takamasa Kitamura, Nagoya; Shigeo Kikori, Toyota, all of Japan

[73] Assignee: Aisan Kogyo Kabushiki Kaisha, Japan

[21] Appl. No.: 08/987,158

[22] Filed: Dec. 8, 1997

[30] Foreign Application Priority Data

Dec. 17, 1996 [JP] Japan ..................... 8-336536

[51] Int. Cl.$^6$ .............. F02D 11/10; G05B 11/42
[52] U.S. Cl. ............................. 123/399; 318/610
[58] Field of Search ....................... 123/399, 361; 318/609, 610, 632; 251/129.04

[56] References Cited

U.S. PATENT DOCUMENTS 4,941,444  7/1990  Fujita ............................... 123/399

FOREIGN PATENT DOCUMENTS 7-293284  11/1995  Japan .

*Primary Examiner*—Andrew M. Dolinar
*Assistant Examiner*—Arnold Castro
*Attorney, Agent, or Firm*—Finnegan, Henderson, Farabow, Garrett & Dunner, L.L.P.

[57] ABSTRACT

A throttle valve controller achieves high output response to the smaller deviation of the actual opening from the demand opening of the throttle valve and achieves high control stability against the larger deviation. It has a preset data table containing proportional gain values and integral gain values of PID control in correspondence to deviation values in inversely proportional arrangement. During the transitional state of control system, a pair of provisional gain values are read out of the table in response to the deviation value: (step S3), these gain values are compared with those of the previous operation cycle and the smaller gain value pair are selected: (steps S4–S7), and the valve drive signal is calculated from the selected gain values:(steps S8, S11). Consequently, the controller achieves high output response to the smaller deviation due to the larger gain value and high control stability without the overshooting of valve movement against the larger deviation due to the smaller gain value.

22 Claims, 6 Drawing Sheets

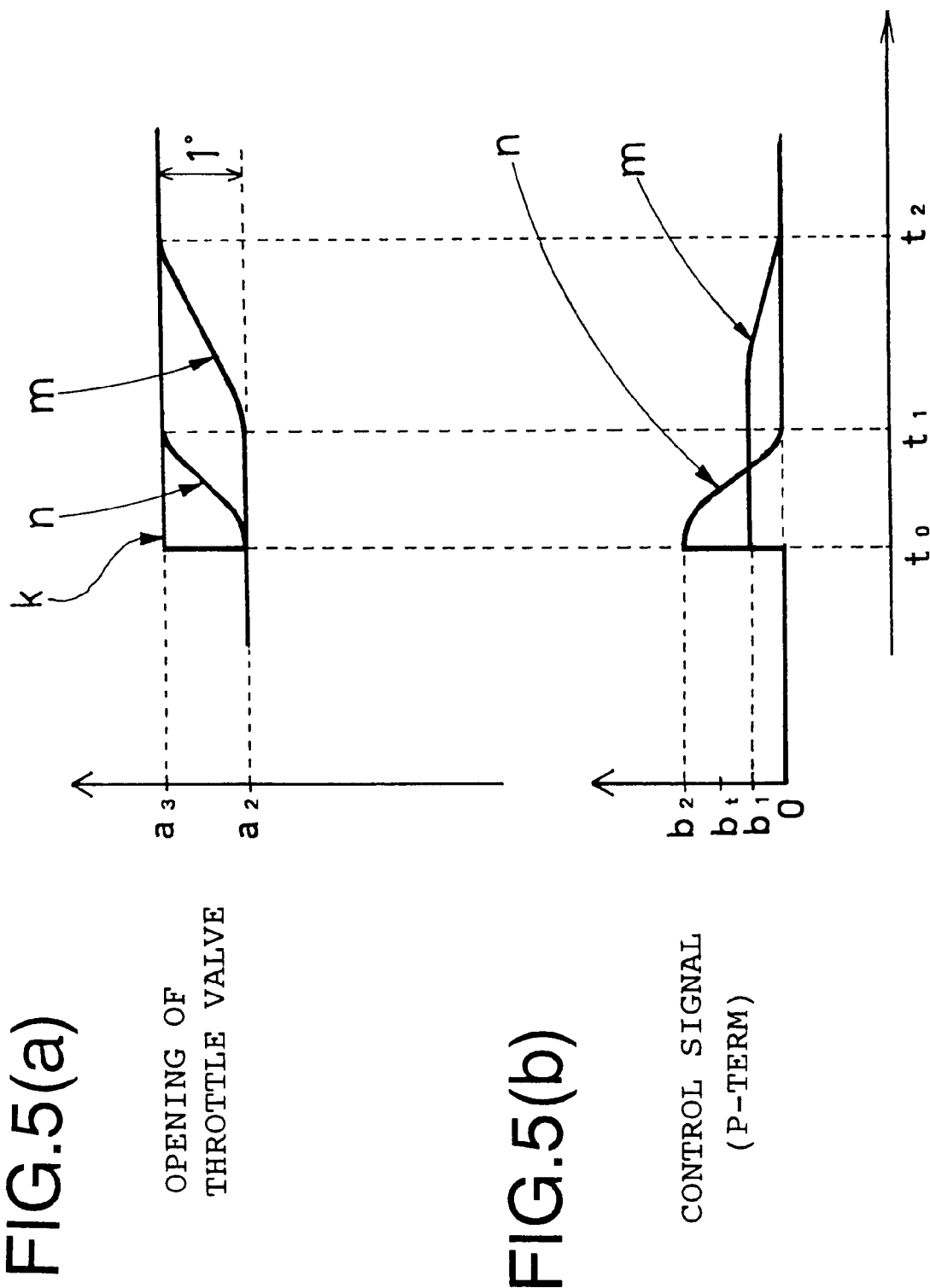

THROTTLE VALVE CONTROLLER

BACKGROUND OF THE INVENTION

1. Field of the Invention

The present invention relates to the electronic control of the throttle valve of an internal combustion engine for controlling the opening of throttle valve with an actuator to meet the demand opening which is determined in accordance with certain information in addition to the depth of the accelerator pedal operated by the driver. More particularly, the invention relates to a throttle valve controller capable of actuating the throttle valve properly irrespective of the deviation of the actual opening from the demand opening.

2. Description of the Prior Art

The electronic throttle valve control, which is beneficial for the achievement of traction control and other engine control, is gaining the prevalence remarkably in recent years. A prior art example of electronic throttle valve control is described in Japanese patent Laid-Open No. Hei 7-293284. The throttle valve controller described in this patent publication fundamentally bases its control process on the known PID control scheme. Specifically, a table of control factors is arranged to provide the larger control factor when the deviation is smaller so that the throttle valve is driven only by the term of proportion (P term out of PID) even when the deviation is small.

Based on this variable control factor which is dependent on the deviation, it is possible to drive the throttle valve in response to the P term without waiting for the rise of the term of integration (I term out of PID) even against a small deviation, thereby quickly reducing the deviation, i.e., bringing the actual opening close to the demand opening.

The principle of the above-mentioned operation will be explained with reference to the graphs of FIG. 5. Graph (a) shows the transition of throttle valve operation in which the actual opening is coincident with the demand opening $a_2$, i.e., zero deviation, until time point $t_0$, at which the demand opening is stepped up slightly by 1° to $a_3$ as shown by the curve k. In case the control system adopts a fixed control factor, it uses the same control signal as for the larger deviation value, resulting in a P-term control signal rising merely to $b_1$ as shown by the curve m on graph (b). This control signal is smaller than the minimum control signal $b_t$ for the actuator to produce a torque by which the throttle valve is moved to any extent. On this account, the actual opening stays at $a_2$ until time point $t_1$ when the I term rises significantly, and then the actual opening increases gradually and reaches the demand opening $a_3$ at time point $t_2$ as shown by the curve m on the graph (a). That is, this control system is inferior in output response when the deviation is small.

In contrast, in case the control signal adopts a variable control factor so that the larger control factor is produced against the smaller deviation, the P-term control signal rises to a large value $b_2$ beyond the threshold level $b_t$ as shown by the curve n on the graph (b). Accordingly, the actual opening begins to vary immediately at time point $t_0$ and reaches the demand opening $a_3$ at time point $t_1$ as shown by the curve n on the graph (a). That is, this control system is superior in output response even when the deviation is small.

However, the foregoing prior art throttle valve control cannot achieve stable transitional control inclusive of the output response in a wide range from a small deviation to a large deviation, i.e., another problem emerges when the deviation is large.

This affair will be explained with reference to the graphs of FIG. 6. In FIG. 6, graph (a) shows the transition of throttle valve operation in which the actual opening is coincident with the demand opening $a_1$, i.e., the deviation is zero, until time point $t_0$, at which the demand opening is stepped up greatly by 4° to $a_3$ as shown by the curve h. A resulting large deviation causes the P-term control signal to rise immediately to $b_3$ beyond the threshold level $b_t$ as shown on graph (b), and the throttle valve begins to move to the demand opening $a_3$. In case the control system adopts a fixed control factor, the control signal decreases gradually as the deviation value falls, and the actual opening reaches $a_3$ stably as shown by the curve m on the graph (a). However, if the control factor is varied to be larger for the smaller deviation, as mentioned above, the control signal does not decrease as fast as the fall of the deviation value, causing the actual opening to exceed the demand opening $a_3$ (overshoot) due to the inertia of the throttle valve and actuator as shown by the curve n on the graph (a). The overshooting triggers the oscillation of throttle valve opening, resulting in the oscillation of engine speed and the unstable engine operation.

This means that the prior art throttle valve control achieves high output response to the smaller deviation in exchange for low control stability against the larger deviation, and achieves high control stability against the larger deviation in exchange for lower output response to the smaller deviation. Although the conflicting control qualities associated with the deviation has been explained in connection with the P term of PID control, the same problem exists with the I term. Specifically, when the larger control factor is used against the smaller deviation so that the I term effectuate quickly with the intention of enhancing the output response to the smaller deviation, the I term works to excess against the diminishing deviation, creating the throttle valve movement to overshoot.

SUMMARY OF THE INVENTION

The present invention is intended to overcome the foregoing deficiency of prior art throttle valve control, and its prime object is to provide a throttle valve controller which achieves high output response to the smaller deviation of the actual opening from the demand opening of the throttle valve and high control stability against the larger deviation, and is capable of actuating the throttle valve properly irrespective of the operational condition.

In order to achieve the above object, the invention resides in a throttle valve controller for the throttle valve of an internal combustion engine for determining with drive signal determining means a valve drive signal based on the deviation of the actual opening of the valve from the demand opening multiplied by a control factor, the controller comprising reference means which releases a control factor relevant to each deviation value, and immediate factor memory means which holds a control factor to be used immediately by the drive signal determining means, the drive signal determining means determining the valve drive signal by using one, that is derived from the larger deviation, of the control factor released by the reference means in response to the deviation and the control factor held by the immediate factor memory means.

The reference means mentioned above is arbitrary means -which releases a control factor in response to an input deviation value. For example, it can be a table in which control factors are stored in advance in correspondence to deviation values, or it can be a routine of program which calculates a control factor from an input deviation value based on a predetermined formula. The reference means is designed to normally release a small control factor for a large deviation value and release a large control factor for a small deviation value with the intention of achieving the high output response even in the operational state with a small deviation value. The control factor released by the reference means corresponds directly to the immediate deviation value, and it does not have the hysteresis. The term "actual opening" used in this specification signifies the opening of throttle valve at the real time point and, in addition, the valve opening which has undergone a lead-phase compensation.

The inventive throttle valve controller bases the valve control on the reception of the deviation value (or more specifically, the reception of the demand opening and actual opening of the throttle valve and the calculation of their difference), and the determination of the valve drive signal by the drive signal determining means from the deviation multiplied by a control factor. The control factor used by the drive signal determining means is held in and read out of the immediate factor memory means. When the controller receives a deviation value, the reference means releases a control factor relevant to the input deviation value. This control factor is not used unconditionally by the drive signal determining means, but either this control factor or the control factor that is held currently in the immediate factor memory means (i.e., the control factor which was used previously) is used. The control factor to be used is one of the two control factors derived from the larger of their associated deviation values. The selected control factor is used to determine the valve drive signal by the drive signal determining means.

Accordingly, when the deviation is decreasing, i.e., when the actual opening approaches the demand opening, the control factor used initially for the large deviation value will be used continuously. Therefore, even though a large control factor is used against a small deviation with the intention of enhanced output response, the drive signal does not rise too large against the diminishing deviation, and the overshoot of valve movement does not occur. The problem of conflicting control qualities associated with the deviation value is thus resolved.

The drive signal determined by the throttle valve controller is used to actuate the motor (DC motor, etc.) coupled to the throttle valve of the internal combustion engine so that the throttle valve opens to meet the demand opening.

By the provision of provisional factor determining means which determines a provisional control factor for an deviation value by making reference at a certain time interval to the reference means which releases a control factor in response to a given deviation value, the control factor relevant to the input deviation value is fed to the reference means. By the provision of memory overwriting means which compares the control factor held in the immediate factor memory means with the control factor determined by the provisional factor determination means and revises by overwriting the control factor held in the memory means with the control factor derived from the larger of their associated deviation values, the control factor is selected for the determination of valve drive signal by the drive signal determining means.

In the inventive throttle valve controller, the drive signal determining means determines the valve drive signal from the deviation and control factor based on servo control which is typified by the PID control. By application of the control scheme based solely on the term of proportion (P term) out of PID control, with the terms of integration (I) and differentiation (D) being disregarded, the problem of conflicting control qualities associated with the deviation value can be resolved without relying on the I term but based solely on the P term. Specifically, the drive signal is determined from the deviation value multiplied by a control factor.

It is also possible to resolve the problem of conflicting control qualities associated with the deviation value by application of this control scheme to the I term of PID control. Specifically, the drive signal is determined from the integrated value of the product of the deviation value and a control factor. It is obviously possible to apply this control scheme to both the P term and I term of PID control, and in this case, the problem of conflicting control qualities associated with the deviation can be resolved to the greater extent. Specifically, the drive signal is determined from the deviation value multiplied by a control factor and the integrated value of the product.

In the inventive throttle valve controller, the drive signal is determined solely by the drive signal determining means only during the transitional state when the deviation is greater than or equal to a certain threshold value, and it is determined from the deviation value multiplied by a certain steady-state control factor during the steady state when the deviation is smaller than the threshold value, in which case the achievement of high output response is the deeper concern than the prevention of overshooting. The "steady-state control factor" mentioned above is the control factor released by the reference means in response to a specific deviation value (e.g., the smallest deviation value), or it may be preset independently.

For the implementation of the inventive control scheme, the throttle valve controller determines the valve drive signal based on one of second drive signal determining means which determines the valve drive signal from the deviation value multiplied by a certain steady-state control factor, third drive signal determining means which determines the drive signal from the integrated value of the product of the deviation value and a certain steady-state control factor, and fourth drive signal determining means which determines the drive signal from the deviation value multiplied by a certain steady-state control factor and the integrated value of the product. The valve drive signal is determined by the (first) drive signal determining means only in the transitional state in which the deviation value is greater than or equal to a prescribed threshold value, and determined by any of the second through fourth drive signal determining means in the steady state in which the deviation value is smaller than the threshold value. The second through fourth drive signal determining means also revise by overwriting the control factor held in the immediate factor memory means with the steady-state control factor.

The PID control is also useful for servo control in the steady state. The second drive signal determining means uses the I term, the third drive signal determining means uses the I term, and the fourth drive signal determining means uses both the P term and I term of PID control.

As to which of the (first) drive signal determining means or any of the second through fourth drive signal determining means is the drive signal determination based on is dependent on as to whether the control system is in the transitional state or steady state. On this account, there is provided state judgement means which judges the control system to be in the transitional state if the deviation value is greater than or equal to the threshold value, or otherwise to be in the steady state. In response to the judgement of transitional state by the state judgement means, the valve drive signal is determined by the (first) drive signal determining means. On the other hand, in response to the judgement of steady state by the state judgement means, the valve drive signal is determined by one of the second through fourth drive signal determining means, with the control factor held in the immediate factor memory means being revised by overwriting with the steady-state control factor. Based on this overwriting of control factor, the process by the (first) drive signal determining means takes place properly when the control system goes out of the steady state and enters the transitional state.

BRIEF DESCRIPTION OF THE DRAWINGS

FIGS. 5(a) and 5(b) are graphs used to explain the throttle valve operation at the occurrence of a small deviation of opening.

DESCRIPTION OF THE PREFERRED EMBODIMENT

An embodiment of the present invention will be explained in detail with reference to the drawings. This embodiment is a throttle valve controller of the "electronic throttle" used for the automobile gasoline engine.

Figure 1:
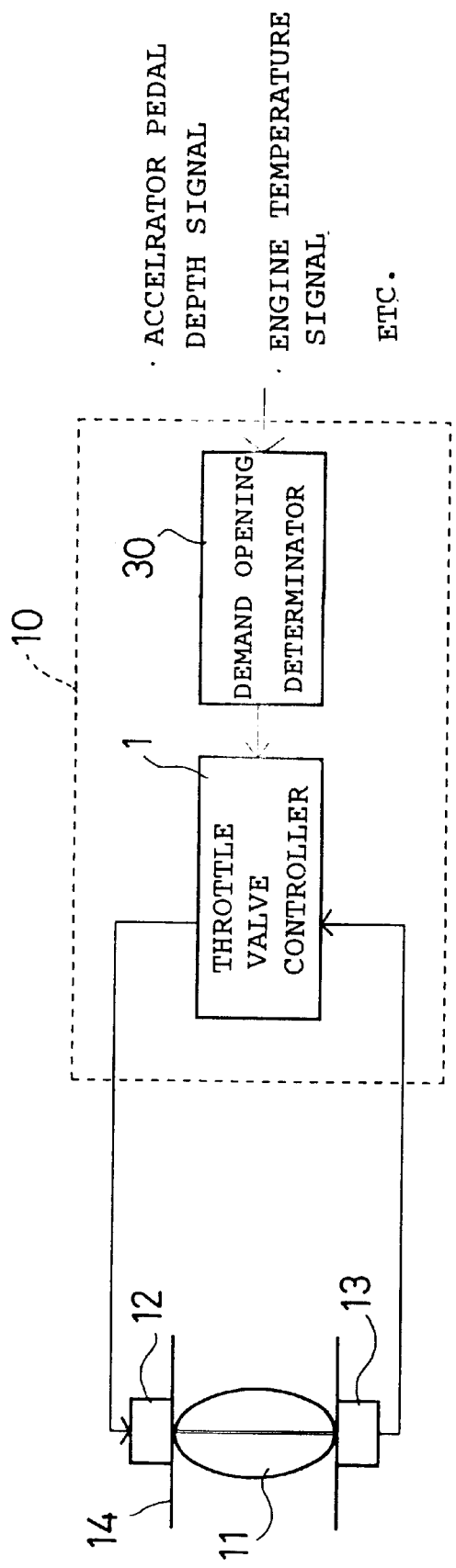
FIG. 1 is a block diagram used to explain the principle of electronic throttle control.

The fundamentals of the electronic throttle will first be explained with reference to FIG. 1. The electronic throttle is made up of a throttle valve 11 which adjusts the air suction resistance of the intake pipe 14 which is the passage of air into the engine, a DC motor 12 which is coupled coaxially to the throttle valve 11, and a valve opening sensor 13. The DC motor 12 and opening sensor 13 are connected to an engine control unit (ECU) 10 which includes a throttle valve controller 1 and a demand opening determinator 30. The DC motor 12 receives the valve drive signal current from the throttle valve controller 1 to turn the throttle valve 11 around the driven shaft thereby to vary the valve opening. The opening sensor 13 detects the actual opening of the throttle valve 11 and indicates it to the throttle valve controller 1. The throttle valve 11 is subjected to a bias force toward the closed state by means of a return spring (not shown).

The throttle valve 11 is not connected by such mechanical means as a wire to the accelerator pedal, but instead it is actuated by the DC motor 12 which is supplied with the drive signal from the throttle valve controller 1 so as to match with the demand opening which is determined by the demand opening determinator 30 in response to the accelerator pedal depth signal and other signals. The demand opening determinator 30 is a microcomputer made up of a known CPU, etc., and it calculates the demand opening of the throttle valve 11 for the throttle valve controller 1 based on various input signals. The values signals input to the demand opening determination 30 include the depth of accelerator pedal, engine coolant temperature, engine speed, and meshing of automatic transmission. The use of these various signals is to accomplish the engine control at the cold start and the switching of transmission, the lean combustion operation, the traction control, etc. that are mostly independent of the operation of accelerator pedal.

Figure 2:
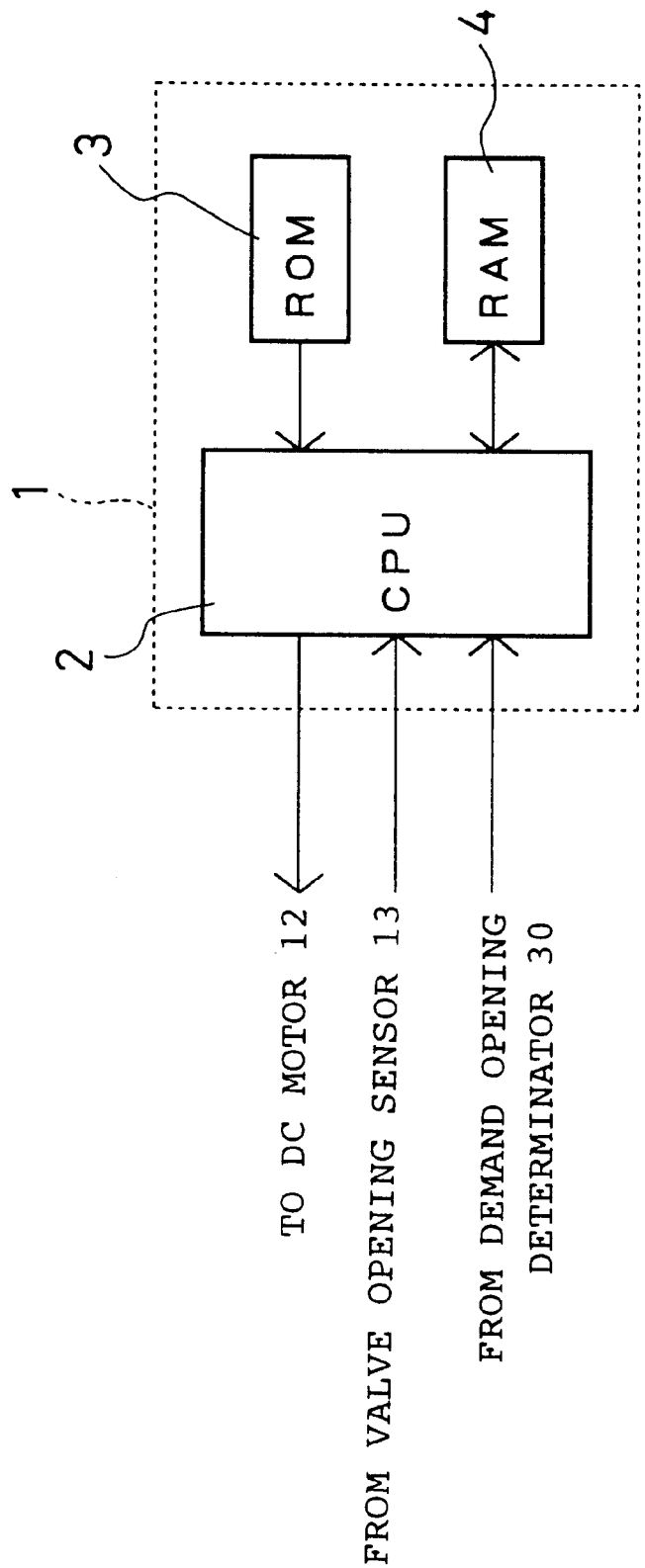
FIG. 2 is a block diagram used to explain the fundamental arrangement of the throttle valve controller.

The throttle valve controller 1 is a microcomputer made up of a known CPU, ROM, RAM, etc. as shown in FIG. 2. The CPU 2 calculates the valve drive signal for the DC motor 12 based on the actual opening signal of the throttle valve 11 provided by the valve opening sensor 13 and the demand opening signal of the throttle valve 11 provided by the demand opening determinator 30. The throttle valve controller 1 transacts these input/output signals through the interface circuit (not shown). The CPU 2 has an associated ROM 3 which stores various control programs and records of reference data, etc., and a RAM 4 which holds data during the calculation process of the CPU 2. The throttle valve controller 1 and demand opening determinator 30 which are formed of separate microcomputers in this embodiment as shown in FIG. 1 and FIG. 2 may share a common microcomputer.

Next, the throttle valve control implemented by the throttle valve controller 1 will be explained. The throttle valve controller 1 performs the PID control, dealing with the terms of proportion (P), integration (I) and differentiation (D) of the deviation G that is a calculated difference (including the polarity) between the input values of demand opening and actual opening. It has a process cycle time of about 2 ms, i.e., the throttle valve 11 is actuated at 500 times per second. Among the PID terms, the present invention does not deeply concern with the D term, and therefore it will be neglected and the D-term gain is assumed to be set to zero in the following explanation. The terms of proportion (P) and integration (I) are explained hereunder.

The P term is calculated as a product $G*K_P$ by multiplying the deviation value G to a P-term gain $K_P$, and the I term is calculated as a integration value $\Sigma(G*K_I)$ by integrating the product of the deviation value G and an I-term gain $K_I$ for one operation cycle after the throttle valve 11 has been actuated previously until it is to be actuated. Several values of P-term gain $K_P$ and I-term gain $K_I$ are preset in correspondence to deviation values G in the form of a table in the ROM 3 as shown in the following Table 1. In this embodiment, the ROM 3 stores four sets of deviation values and gain value pairs, with both the P-term gain $K_P$ and I-term gain $K_I$ being inversely proportional to the deviation value G.

TABLE 1

| deviation value | 0.1° | 1° | 10° | 40° |
|---|---|---|---|---|
| P-term gain | 6 | 4 | 3 | 2 |
| I-term gain | 4 | 3 | 3 | 1 |

The drive signal calculation process of one operation cycle based on the P term and I term will be explained on the flowchart of FIG. 3.

Steps S1, S2: Initially, it is judged as to whether the throttle valve 11 is in the steady state or transitional state. The calculation process divides into the case of steady state in which the deviation of the actual opening from the demand opening is smaller and the throttle valve 11 does not need to move largely and the case of transitional state in which the deviation is larger and a large valve movement is needed. Specifically, the deviation value G is calculated by subtracting the demand opening value from the actual opening value: (S1), and the deviation value G is compared with a prescribed threshold value $G_{TH}$:(S2). The threshold value $G_{TH}$, which is 0.1° in this embodiment, is read out of the ROM 3. If the deviation value G is greater than or equal to $G_{TH}$, the sequence proceeds to step S3 for the process of transitional state: (S2:yes), or if the deviation value G is smaller than $G_{TH}$, the sequence proceeds to step S9 for the process of steady state:(S2:no).

Figure 4:
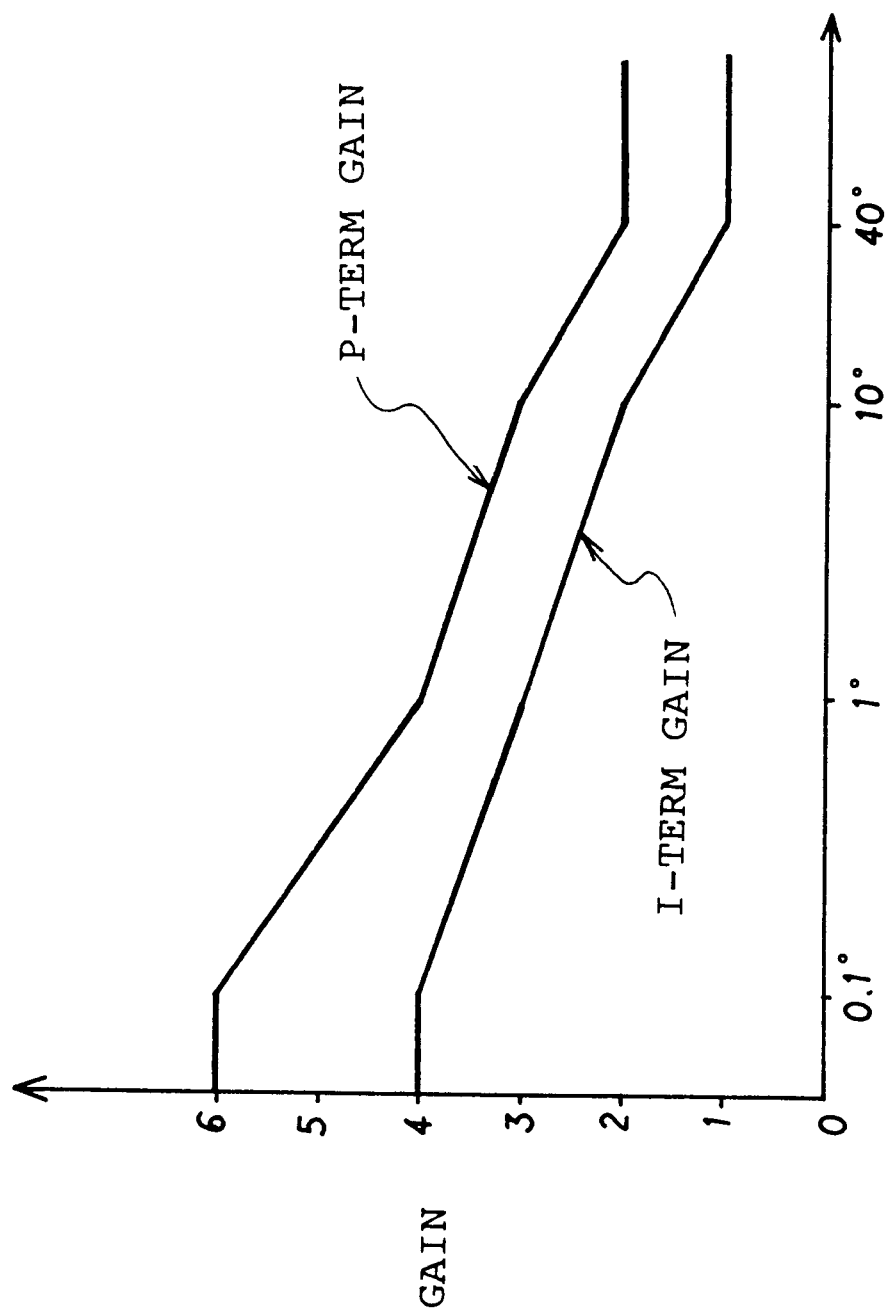
FIG. 4 is a graph showing the provisional gain values preset in the table.

Step S3: At the beginning of the process of transitional state, the table of ROM 3 is referenced to evaluate provisional values of P-term gain $K_P$ and I-term gain $K_I$ for the deviation value G. These values are evaluated based on the linear interpolation as shown in FIG. 4 by using the preset values listed in Table 1. The resulting provisional P-term gain $K_{PA}$ and I-term gain $K_{IA}$ are held in the RAM 4.

Steps S4, S5: For the P-term gain, it is determined as to whether or not the provisional value is used intact. Specifically, the value $K_{PA}$ obtained in S3 is compared with the value $K_{PT}$ used in the previous cycle and held in the RAM 4:(S4). If $K_{PA}$ is smaller than $K_{PT}$: (S4:yes), the $K_{PT}$ is replaced with the $K_{PA}$:(S5), and the sequence proceeds to step S6. Otherwise, if $K_{PA}$ is greater than or equal to $K_{PT}$:(S4:no), the sequence proceeds to step S6 directly. This means that only if the provisional P-term gain evaluated newly in S3 is smaller than the gain used in the previous cycle, the new value is selected, or otherwise the value of the previous cycle is selected continuously. [0033]

Instead of comparing the $K_{PA}$ and $K_{PT}$ in step S4, the corresponding deviation values G may be compared at the opposite condition of comparison. Specifically, if the deviation value G for $K_{PA}$ is greater than that for $K_{PT}$:(S4:yes), the sequence proceeds to S5 for overwriting, or if the deviation value G for $K_{PA}$ is smaller than or equal to that for $K_{PT}$: (S4:no), the sequence proceeds directly to S6.

Steps S6, S7: For the I-term gain, it is determined as to whether or not the provisional value of S3 is selected. Specifically, the value $K_{IA}$ obtained in S3 is compared with the value $K_{IT}$ used in the previous cycle and held in the RAM 4 similar to step S4:(S6). If $K_{IA}$ is smaller than $K_{IT}$:(S6: yes), the $K_{IT}$ is replaced with the $K_{IA}$:(S7), and the sequence proceeds to step S8. Otherwise, if $K_{IA}$ is greater than or equal to $K_{IT}$:(S6:no), the sequence proceeds to step S8 directly. This means that only if the provisional I-term gain evaluated newly in S3 is smaller than the gain used in the previous cycle, the new value is selected, or otherwise the value of the previous cycle is selected continuously. Instead of comparing the $K_{IA}$ and $K_{IT}$ in step S6, the corresponding deviation values G may be compared.

Step S8: The P-term gain $K_{PT}$ and I-term gain $K_{IT}$ selected in the process of steps S4 to S7 are held as $K_P$ and $K_I$ in the RAM 4. In the case where $K_P$ and $K_I$ have been already stored in the RAM 4, they are overwritten. The $K_P$ and $K_I$ are settled values of the P-term gain and I-term gain to be used for the calculation process of the immediate cycle. The $K_{PT}$ and $K_{IT}$ are held intact so as to be used for the comparison in S4 and S6 of the next cycle. With both gain values for the calculation process being settled, the sequence proceeds to step S11.

Steps S9 and S10: In case the deviation value G is smaller than the threshold value $G_{TH}$ in step S2:(S2:no), the process of steady state is carried out. Specifically, the preset P-term gain $K_{PS}$ and I-term gain $K_{IS}$ for the steady-state process are read out of the ROM 3 and latched as $K_P$ and $K_I$ in the RAM 4:(S9). In the case where $K_P$ and $K_I$ have been already stored in the RAM 4, they are overwritten. The value of $K_{PS}$ and $K_{IS}$ are prepared in advance. These values are the gain values for the smallest deviation value 0.1° in Table 1. The $K_{PT}$ and $K_{IT}$ are replaced with the $K_{PS}$ and $K_{IS}$ for the process of transitional state in the next operation cycle:(S10).

Step S11: The valve drive signal is calculated from the gain values $K_P$ and $K_I$ that have been settled in S8 for the transitional state or in S9 for the steady state. The calculation is the summation of the P-term ($G*K_P$) and I-term ($\Sigma(G*K_I)$). The resulting valve drive signal, which signifies the control value to be applied to the throttle valve 11, is converted into an intermittent power voltage having a duty-cycle and fed to the DC motor 12. The DC motor 12 produces a torque from the drive current and actuates the throttle valve 11.

The foregoing process is repeated at the cycle time of about 2 ms so that the actual opening of the throttle valve 11 is controlled to follow the demand opening.

The throttle valve control in response to the variation of demand opening will be explained with reference to FIG. 5.

In the illustrated example, the deviation value G is zero until time point $t_0$, at which an opening deviation of 1° arises. In the preceding cycles before the time point $t_0$, the steady-state control takes place based on the judgement of "no" in step S2 for the zero deviation value G. Accordingly, the $K_P$ and $K_I$, and $K_{PT}$ and $K_{IT}$ are retained to be $K_{PS}$ and $K_{IS}$ i.e., 6 and 4 in Table 1, respectively, in this period. The drive signal calculated in step S11 for zero deviation value G is derived from the I term for counteracting against the bias force of the return spring. This is the equilibrium state of the driving force of the DC motor 12 to open the throttle valve and the spring bias force to close the valve, and the throttle valve 11 has its opening unchanged.

In the first cycle following the time point $t_0$, the sequence enters the process of transitional state based on the judgement of "yes" in step S2. The table of ROM 3 (shown by Table 1) is referenced in step S3 to get provisional gain values $K_{PA}=4$ and $K_{IA}=3$ for the deviation value of 1°. Since these values are smaller than the held values $K_{PT}$ and $K_{IT}$, the steps S4 and S6 make "yes" judgements to overwrite the $K_{PT}$ and $K_{IT}$ with the new values 4 and 3:(S5, S7). The $K_P$ and $K_I$ are also replaced with the newly selected values 4 and 3:(S8). The drive signal is calculated from the deviation value of 1° and the determined gain values 4 and 3 in step S11.

The Table 1 reveals that these determined gain values are greater than gain values for larger deviation values G. On this account, even though the deviation value G=1° is small, a valve drive signal large enough to start the DC motor 12 is produced by the P-term. Accordingly, the throttle valve 11 begins to move immediately toward the demand opening without waiting for the rise of the I-term as shown by the curve n on the graph (a) of FIG. 5. That is, the control system is highly responsive to a small deviation. This process of transitional state is repeated until the actual opening of the throttle valve 11 settles to the demand opening. As the deviation value G decreases gradually from 1°, provisional gain values to be got in step S3 increase as shown by Table 1 and FIG. 4. However, the steps S4 and S6 always make "no" judgements thereby to select the gain values 4 and 3 continuously. When the deviation value G falls below 0.1°, the sequence returns to the process of steady state.

In case the deviation value G arising at time point $t_0$ is as small as 0.2°, the P-term may not produce a valve drive signal large enough to start the DC motor 12 even though the P-term gain is as large as 5.8. However, the I-term gain is also large in this case, and the quick-rising I-term attains the practically-sufficient output response.

Figure 6A:
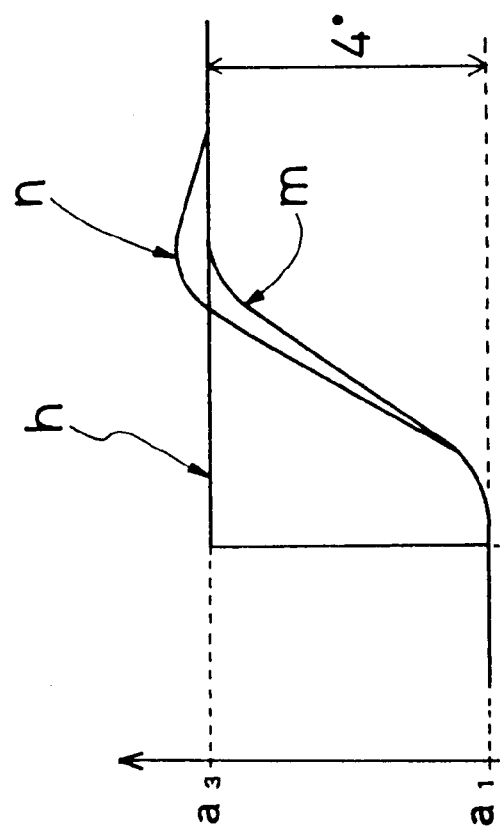
FIGS. 6(a) and 6(b) are graphs used to explain the throttle valve operation at the occurrence of a large deviation of opening.
Figure 6B:
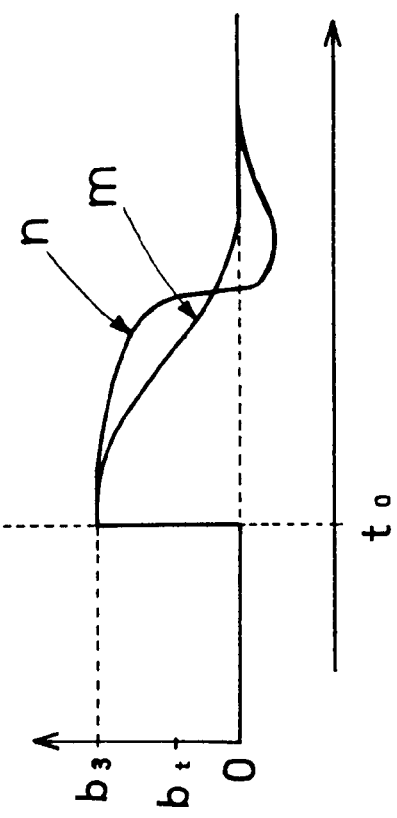

Explained next is the case where the deviation value G is zero until time point $t_0$, at which an opening deviation of 4° arises as shown in FIG. 6. The preceding cycles before the time point $t_0$ are the same as the previous example shown in FIG. 5, in which the process of steady state takes place, with the $K_P$ and $K_I$, and $K_{PT}$ and $K_{IT}$ being retained to be $K_{PS}$ and $K_{IS}$, respectively, and the throttle valve 11 has its opening unchanged.

In the first cycle following the time point $t_0$, the sequence enters the process of transitional state based on the judgement of "yes" in step S2. The table of ROM 3 (shown by Table 1) is referenced in step S3 to get provisional gain values $K_{PA}$=3.7 and $K_{IA}$=2.7 for the deviation value of 4° as shown in FIG. 4. Since these values are smaller than the held values $K_{PT}$=6 and $K_{IT}$=4, the steps S4 and S6 make "yes" judgements to overwrite the $K_{PT}$ and $K_{IT}$ with these new values:(S5, S7). The $K_P$ and $K_I$ are also replaced with the newly selected values 3.7 and 2.7:(S8). The valve drive signal is calculated from the deviation value of 4° and the determined gain values 3.7 and 2.7 in step S11. The deviation value G decreases gradually from 4°, accordingly.

As the deviation value G decreases gradually from 4°, provisional gain values $K_{PA}$ and $K_{IA}$ to be got in step S3 increase. These values are greater than the held values $K_{PT}$=3.7 and $K_{IT}$=2.7, causing the steps S4 and S6 to make "no" judgements to select and retain the gain values $K_{PT}$=3.7 and $K_{IT}$=2.7. The $K_P$ and $K_I$ are also retained to be 3.7 and 2.7:(S8).

When the deviation value G falls to 1°, which is equal to the deviation value at time point $t_0$ of FIG. 5, the produced drive signal is smaller in proportion to the smaller values of $K_P$ and $K_I$ relative to the case of FIG. 5. Therefore, the output response is stable even for a large deviation. If the drive signal of FIG. 5 which produces such a large torque as to start the DC motor 12 were to be applied to the DC motor 12 which is already running, the excessive driving force would make the throttle valve to overshoot as shown by the curve n in FIG. 6. In contrast, by using the small gain values continuously, generation of excessive driving force can be prevented and the stable output response without overshooting can be achieved as shown by the curve m.

The $K_P$ and $K_{IT}$ and $K_{PT}$ and $K_{IT}$ are retained to be 3.7 and 2.7, respectively, until the control system enters the steady state, with the deviation value G falling below 0.1°. Once the control system enters the steady state, the $K_P$ and $K_I$, and $K_{PT}$ and $K_{IT}$ become 6 and 4, respectively, as in the previous case of FIG. 5. Consequently, even after the output response to a large deviation as shown by the curve m of FIG. 6, the $K_{PT}$ and $K_{IT}$ take large values once the control system enters the steady state with a small deviation, and the throttle valve 11 is controlled to have high output response shown by the curve n in FIG. 5.

In case a large opening deviation arises amid the transitional state of control as shown by the curve n in FIG. 5, the valve control operation is the same as shown by the curve m in FIG. 6.

In this embodiment, as described above, the provisional P-term and I-term gains have their values $K_{PA}$ and $K_{IA}$ designed to be inversely proportional to the deviation value G (as shown in Table 1) for the process of transitional state, and the smaller of these values or the values $K_{PT}$ and $K_{IT}$ used in the previous cycle are selected as $K_P$ and $K_I$ for the immediate calculation process. Accordingly, the control system has a large gain against a small deviation, applying a large drive force to the stopping throttle valve 11, so that the actual opening approaches the demand opening quickly.

On the other hand, the control system has a small gain against a large deviation and keeps the small gain to produce a small drive force even after the deviation has diminished, preventing the already-moving throttle valve 11 from overshooting. Consequently, this throttle valve controller is capable of achieving high output response to the smaller deviation and high control stability against the larger deviation.

This throttle valve controller judges the control system to be in the steady state or transitional state based on the comparison of the deviation value G of opening with the prescribed value in each operation cycle, and calculates the valve drive signal of the steady state based on the gain values $K_{PS}$ and $K_{IS}$ specific to this state. In this case, the $K_{PT}$ and $K_{IT}$ are also replaced with the $K_{PS}$ and $K_{IS}$, so that throttle valve control of high output response and high control stability can be attained to match with the deviation value when the control system shifts from the steady state to the transitional state.

The computers and accompanying sensors and throttle valve actuator are combined with a ROM 3 which stores the control programs and data, and they function as throttle valve controller described above.

While the present invention has been described for a specific embodiment, it is apparent that various changes and modifications can be made without departing from the present invention in its broader aspects. For example, instead of the provisional gain setting and selection for both the P term and I term in the foregoing embodiment, the process may be implemented only for one term, with another term being treated in the conventional manner. Otherwise, the valve drive signal may be determined based on one of the P term and I term. Otherwise, the D term, which is not used in the foregoing embodiment, may be included in the process of determining the valve drive signal in both the transitional state and steady state.

Figure 3:
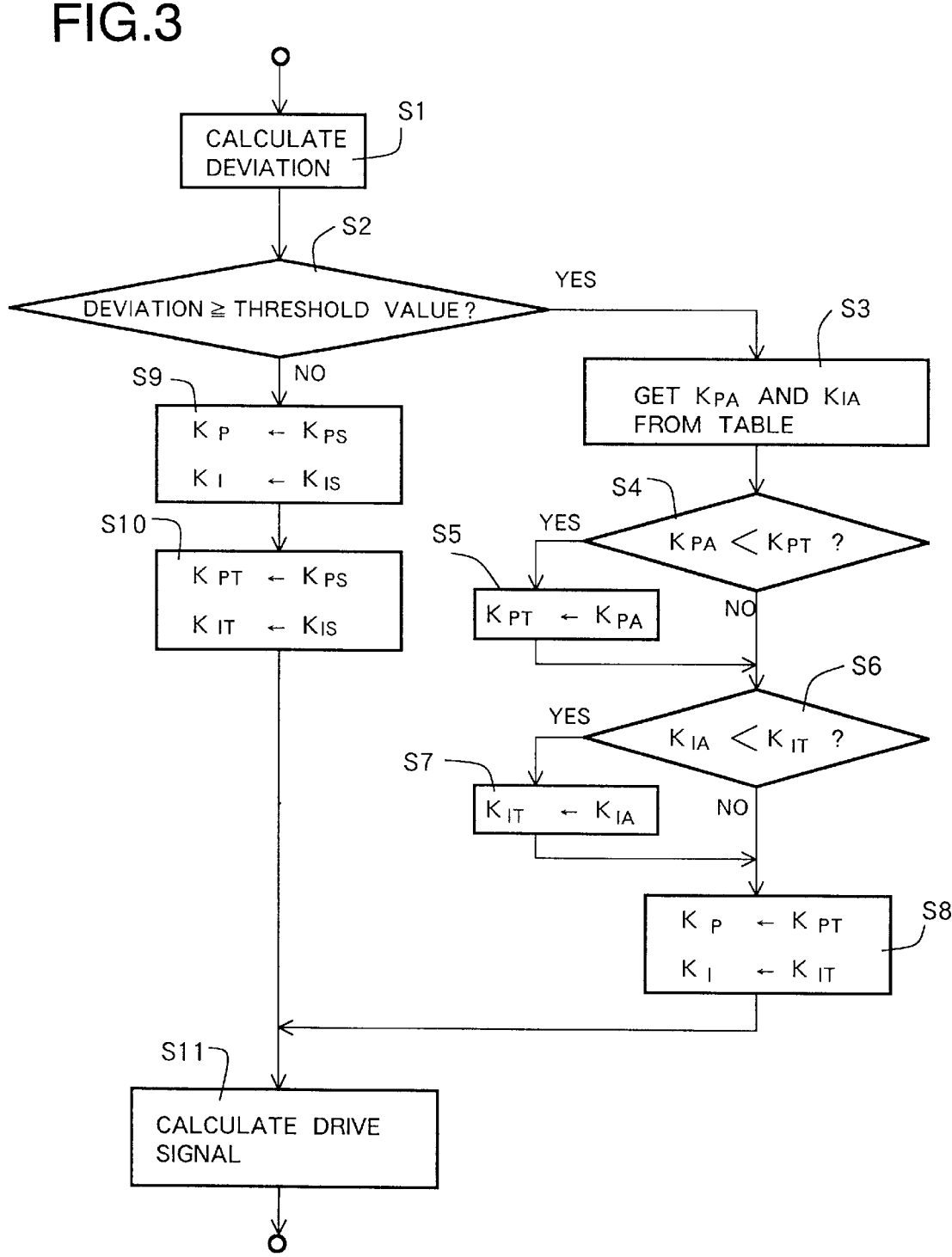
FIG. 3 is a flowchart used to explain the control process of the throttle valve controller based on an embodiment of this invention.

Instead of the linear interpolation shown in FIG. 4 used for the evaluation of provisional gain values in step S3 on the flowchart of FIG. 3, an alternative manner is to segment the deviation value more finely and obtain provisional gain values for an deviation value directly with reference to the table.

Instead of using the gain values for the smallest deviation value of transitional state, i.e., 0.1° in Table 1, as gain values $K_{PS}$ and $K_{IS}$ of steady state in the process of steps S9 and S10 on the flowchart of FIG. 3, arbitrary gain values specific to the steady state may be preset in the ROM 3.

Instead of using the output signal of the opening sensor 13 directly for the calculation of deviation value G, the signal of actual opening may be rendered the lead-phase compensation for example. An example of the simplest form of lead-phase compensation is as follows:

$$D_A = T_A + d*(T_A - T_A')$$

where $T_A$ is the crude actual opening, $T_A'$ is the actual opening of the previous cycle, d is the gain of compensation, and $D_A$ is the actual opening after the lead-phase compensation.

According to the present invention as described above, there is provided a throttle valve controller which achieves high output response to the smaller deviation of the actual opening from the demand opening of the throttle valve and high control stability against the larger deviation, and is capable of actuating the throttle valve properly irrespective of the operational condition.

What is claimed is:

1. A throttle valve controller for the throttle valve of an internal combustion engine for determining with drive signal determining means a valve drive signal based on the deviation of the actual opening of said valve from the demand opening multiplied by a control factor, said controller comprising:

reference means which releases a control factor relevant to each deviation value; and immediate factor memory means which holds a control factor to be used immediately by said drive signal determining means, said drive signal determining means determining the valve drive signal by using one, that is derived from the larger deviation value, of the control factor released by said reference means in response to the deviation value and the control factor held by said immediate factor memory means.

2. A throttle valve controller according to claim 1 further including:

provisional factor determining means which determines a provisional control factor relevant to the deviation value by making reference to said reference means at a predetermined time interval; and control factor overwriting means which compares the provisional control factor determined by said provisional factor determining means with the control factor held by said immediate factor memory means and revises by overwriting the control factor held in said immediate factor memory means with one of the compared control factors derived from the larger of their associated deviation values, said drive signal determining means determines the valve drive signal based on the control factor overwritten in said immediate factor memory means by said control factor overwriting means.

3. A throttle valve controller according to claim 1, wherein said drive signal determining means determines the valve drive signal based on the deviation value multiplied by the control factor.

4. A throttle valve controller according to claim 2, wherein said drive signal determining means determines the valve drive signal based on the deviation value multiplied by the control factor.

5. A throttle valve controller according to claim 1, wherein said drive signal determining means determines the valve drive signal based on the integrated value of the product of the deviation value and the control factor.

6. A throttle valve controller according to claim 2, wherein said drive signal determining means determines the valve drive signal based on the integrated value of the product of the deviation value and the control factor.

7. A throttle valve controller according to claim 1, wherein said drive signal determining means determines the valve drive signal based on the deviation value multiplied by the control factor and the integrated value of the product of the deviation value and the control factor.

8. A throttle valve controller according to claim 2, wherein said drive signal determining means determines the valve drive signal based on the deviation value multiplied by the control factor and the integrated value of the product of the deviation value and the control factor.

9. A throttle valve controller according to claim 1, wherein the valve drive signal is determined by said drive signal determining means only in the transitional state in which the deviation value is greater than or equal to a prescribed threshold value, or determined based on the deviation value multiplied by a prescribed control factor in the steady state in which the deviation value is smaller than the prescribed threshold value.

10. A throttle valve controller according to claim 3 further including second drive signal determining means which determines the valve drive signal based on the deviation value multiplied by a prescribed steady-state control factor, said valve drive signal being determined by said drive signal determining means only in the transitional state in which the deviation value is greater than or equal to a prescribed threshold value, or determined by said second drive signal determining means in the steady state in which the deviation value is smaller than the prescribed threshold value.

11. A throttle valve controller according to claim 5 further including third drive signal determining means which determines the valve drive signal based on the integrated value of the product of the deviation value and a prescribed steady-state control factor, said valve drive signal being determined by said drive signal determining means only in the transitional state in which the deviation value is greater than or equal to a prescribed threshold value, or determined by said third drive signal determining means in the steady state in which the deviation value is smaller than the prescribed threshold value.

12. A throttle valve controller according to claim 7 further including fourth drive signal determining means which determines the valve drive signal based on the deviation value multiplied by a prescribed steady-state control factor and the integrated value of the product of the deviation value and a prescribed steady-state control factor, said valve drive signal being determined by said drive signal determining means only in the transitional state in which the deviation value is greater than or equal to a prescribed threshold value, or determined by said fourth drive signal determining means in the steady state in which the deviation value is smaller than the prescribed threshold value.

13. A throttle valve controller according to claim 2 further including:

state judgement means which compares the deviation value with a prescribed threshold value and judges the operational state to be the transitional state if the deviation value is greater than or equal to the threshold value or to be the steady state otherwise; and second drive signal determining means which determines the valve drive signal based on the deviation value multiplied by a prescribed steady-state control factor and revises by overwriting the control factor held in said immediate factor memory means with the steady-state control factor if said state judgement means judges the operational state to be the steady state, the drive signal being determined by said drive signal determining means if said state judgement means judges the operational state to be the transitional state.

14. A throttle valve controller according to claim 2 further including:

state judgement means which compares the deviation value with a prescribed threshold value and judges the operational state to be the transitional state if the deviation value is greater than or equal to the threshold value or to be the steady state otherwise; and third drive signal determining means which determines the valve drive signal based on the integrated value of the product of the deviation value and a prescribed steady-state control factor and revises by overwriting the control factor held in said immediate factor memory means with the steady-state control factor if said state judgement means judges the operational state to be the steady state, the drive signal being determined by said drive signal determining means if said state judgement means judges the operational state to be the transitional state.

15. A throttle valve controller according to claim 2 further including:
   state judgement means which compares the deviation value with a prescribed threshold value and judges the operational state to be the transitional state if the deviation value is greater than or equal to the threshold value or to be the steady state otherwise; and
   fourth drive signal determining means which determines the valve drive signal based on the deviation value multiplied by a prescribed steady-state control factor and the integrated value of the product of the deviation value and the steady-state control factor and revises by overwriting the control factor held in said immediate factor memory means with the steady-state control factor if said state judgement means judges the operational state to be the steady state,
   the drive signal being determined by said drive signal determining means if said state judgement means judges the operational state to be the transitional state.

16. A throttle valve controller according to claim 4 further including:
   state judgement means which compares the deviation value with a prescribed threshold value and judges the operational state to be the transitional state if the deviation value is greater than or equal to the threshold value or to be the steady state otherwise; and
   second drive signal determining means which determines the valve drive signal based on the deviation value multiplied by a prescribed steady-state control factor and revises by overwriting the control factor held in said immediate factor memory means with the steady-state control factor if said state judgement means judges the operational state to be the steady state,
   the drive signal being determined by said drive signal determining means if said state judgement means judges the operational state to be the transitional state.

17. A throttle valve controller according to claim 6 further including:
   state judgement means which compares the deviation value with a prescribed threshold value and judges the operational state to be the transitional state if the deviation value is greater than or equal to the threshold value or to be the steady state otherwise; and
   third drive signal determining means which determines the valve drive signal based on the integrated value of the product of the deviation value and a prescribed steady-state control factor and revises by overwriting the control factor held in said immediate factor memory means with the steady-state control factor if said state judgement means judges the operational state to be the steady state,
   the drive signal being determined by said drive signal determining means if said state judgement means judges the operational state to be the transitional state.

18. A throttle valve controller according to claim 8 further including:
   state judgement means which compares the deviation value with a prescribed threshold value and judges the operational state to be the transitional state if the deviation value is greater than or equal to the threshold value or to be the steady state otherwise; and
   fourth drive signal determining means which determines the valve drive signal based on the deviation value multiplied by a prescribed steady-state control factor and the integrated value of the product of the deviation value and the steady-state control factor and revises by overwriting the control factor held in said immediate factor memory means with the steady-state control factor if said state judgement means judges the operational state to be the steady state,
   the drive signal being determined by said drive signal determining means if said state judgement means judges the operational state to be the transitional state.

19. A throttle valve controller according to claim 9 further including:
   state judgement means which compares the deviation value with a prescribed threshold value and judges the operational state to be the transitional state if the deviation value is greater than or equal to the threshold value or to be the steady state otherwise,
   the drive signal being determined by said drive signal determining means if said state judgement means judges the operational state to be the transitional state, or determined based on the deviation value multiplied by a prescribed steady-state control factor if said state judgement means judges the operational state to be the steady state.

20. A throttle valve controller according to claim 10 further including:
   state judgement means which compares the deviation value with a prescribed threshold value and judges the operational state to be the transitional state if the deviation value is greater than or equal to the threshold value or to be the steady state otherwise,
   the drive signal being determined by said drive signal determining means if said state judgement means judges the operational state to be the transitional state, or determined by said second drive signal determining means if said state judgement means judges the operational state to be the steady state.

21. A throttle valve controller according to claim 11 further including:
   state judgement means which compares the deviation value with a prescribed threshold value and judges the operational state to be the transitional state if the deviation value is greater than or equal to the threshold value or to be the steady state otherwise,
   the drive signal being determined by said drive signal determining means if said state judgement means judges the operational state to be the transitional state, or determined by said third drive signal determining means if said state judgement means judges the operational state to be the steady state.

22. A throttle valve controller according to claim 12 further including:
   state judgement means which compares the deviation value with a prescribed threshold value and judges the operational state to be the transitional state if the deviation value is greater than or equal to the threshold value or to be the steady state otherwise,
   the drive signal being determined by said drive signal determining means if said state judgement means judges the operational state to be the transitional state, or determined by said fourth drive signal determining means if said state judgement means judges the operational state to be the steady state.

* * * * *